(12) United States Patent
Eldridge et al.

(10) Patent No.: US 6,515,988 B1
(45) Date of Patent: Feb. 4, 2003

(54) TOKEN-BASED DOCUMENT TRANSACTIONS

(75) Inventors: Marge Eldridge, Shelford (GB); Michael J. Flynn, Milton (GB); Chris Jones, Trumpington (GB); Michael Kleyn, Blackheath (GB); Michael G. Lamming, Cambridge (GB); David Pendlebury, Lancs (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/118,322

(22) Filed: Jul. 17, 1998

(30) Foreign Application Priority Data

Jul. 21, 1997 (GB) ............................................. 9715256

(51) Int. Cl.⁷ .............................................. H04L 12/28
(52) U.S. Cl. ....................................... 370/389; 709/217
(58) Field of Search ................................ 370/389, 390, 370/392, 252, 313, 464, 465, 466, 467; 709/200, 217, 219, 228

(56) References Cited

U.S. PATENT DOCUMENTS

| | | | |
|---|---|---|---|
| 5,581,752 A | * 12/1996 | Inoue et al. | 707/526 |
| 5,629,980 A | 5/1997 | Stefik et al. | 380/4 |
| 5,715,403 A | 2/1998 | Stefik | 395/244 |
| 5,752,079 A | 5/1998 | Melen et al. | 395/827 |

(List continued on next page.)

FOREIGN PATENT DOCUMENTS

| | | |
|---|---|---|
| EP | 0 691 619 A2 | 1/1996 |
| EP | 0 700 006 A1 | 3/1996 |
| GB | 2 296 115 A | 6/1996 |

OTHER PUBLICATIONS

Weiser, Mark D. et al. Corresponding U.S. Appl. No. 08/623,436, filed Mar. 28, 1996, entitled "Personal Storage Device for Application and Data Transfer".

Primary Examiner—Dang Ton
Assistant Examiner—Brian Nguyen (57) ABSTRACT

A system including any number workstations, file servers, printers and other fixed devices coupled in a network, and a number of portable devices carried by users and coupled to the network by infrared (IR) link. Each portable device emulates its user's personal satchel for documents: the device is programmed to receive transmit and store document or service tokens (tokens). Preferably, the token comprises a plurality of components defining a document related entity and a property of the entity, the token components including an operation component designating a document related operation, an address component designating the electronic address of a document or system providing a document related service, one or more parameter components, each parameter component defining a property of a document or a property of a service to be applied to a document, and a security parameter dependent upon the identity of a user associated with a document or with a document related service. The tokens are distributed from one person to another by transmission of IR data packets, and once a network-connected computer, printer or multi-function device has received a token via IR transceiver associated with it, a search request can be derived from the token and document references (e.g. WWW URLs) satisfying the token can be obtained via a search engine. For each URL obtained, the corresponding electronic document can be retrieved from a repository and displayed or printed. The portable device is preferably a handheld or wristwatch computer with a graphical display for enabling the user to transfer tokens, and the fixed devices preferably include a scanner/copier/printer having its own IR transceiver.

21 Claims, 8 Drawing Sheets

U.S. PATENT DOCUMENTS

| | | |
|---|---|---|
| 5,767,847 A | 6/1998 | Mori et al. .................. 345/329 |
| 5,774,637 A | 6/1998 | Haber et al. ................. 395/114 |
| 5,781,901 A | 7/1998 | Kuzma ........................ 707/10 |
| 5,790,790 A | 8/1998 | Smith et al. ........... 395/200.36 |
| 5,857,065 A | 1/1999 | Suzuki ....................... 395/114 |
| 5,862,321 A * | 1/1999 | Lamming et al. ........... 709/200 |
| 5,870,089 A | 2/1999 | Fabbio et al. ............... 345/335 |
| 5,903,723 A | 5/1999 | Beck et al. .............. 395/200.3 |
| 5,911,776 A | 6/1999 | Guck ........................ 709/217 |
| 5,918,013 A | 6/1999 | Mighdoll et al. ...... 395/200.47 |
| 5,923,845 A | 7/1999 | Kamiya et al. ........ 395/200.36 |
| 5,960,085 A * | 9/1999 | De La Huerga ........... 340/5.61 |
| 5,982,506 A | 11/1999 | Kara .......................... 358/405 |
| 5,982,520 A | 11/1999 | Weiser et al. ............... 359/172 |
| 6,081,814 A | 6/2000 | Mangat et al. .............. 707/501 |
| 6,105,013 A * | 8/2000 | Curry et al. ................... 705/65 |
| 6,129,449 A * | 10/2000 | McCain et al. ............. 700/244 |
| 6,138,151 A * | 10/2000 | Reber et al. ................ 709/219 |
| 6,144,997 A * | 11/2000 | Lamming et al. ........... 709/217 |
| 6,147,773 A * | 11/2000 | Taylor et al. ............... 358/400 |

* cited by examiner

TOKEN-BASED DOCUMENT TRANSACTIONS

FIELD OF THE INVENTION

The present invention relates to data processing, and more particularly relates to the transfer between computing devices, and the retrieval by such devices, of document related information. Even more particularly, the invention concerns such information retrieval, transfer and processing using tokens.

BACKGROUND AND SUMMARY OF THE INVENTION

While the use of portable computing devices is becoming more widespread, transfer of information between such devices is often limited due to inadequate storage capacity or communication channel bandwidth. One possible system for overcoming as these limitations is disclosed in European patent application EP-A-691,619, published Jan. 10, 1996 (hereafter "EP'619"), which discloses a system for transferring document identifiers representing a particular document between computers, rather than the document itself. This system can include any number workstations, file servers, printers and other fixed devices (including multifunction devices) coupled in a network, and a number of portable devices (e.g. handheld or wristwatch computer) carried by users and coupled to the network by infrared (IR) link. Each portable device is in effect a user's personal satchel for documents, with the devices being programmed to receive, transmit, and store document identifiers (e.g. World Wide Web URLs), each of which is associated with an electronic document stored in an electronic repository at a site on the web. Documents are effectively distributed between devices by transmission of document URLs, rather than the lengthy document itself. For example, a document can be sent to an IR transceiver equipped network printer by "beaming" that document's URL from a handheld portable computer to the network printer. The network printer retrieves the complete document referenced by the URL, and immediately prints a copy.

While useful, the foregoing system may not always support operations, security measures, or parameters required by mobile workers interacting with various computational devices in the workplace. For example, a network printer beamed a document identifier might print the document as single sided using its default settings, even though the mobile worker may actually desire double sided printing. Accordingly, the present invention provides a method for supporting a wide range of digital applications that can be carried out in a data processing device that includes a processor, memory, and a user interface. In response to user input, the data processing device can generate a token comprising an operation component designating a document related operation (e.g. single sided or double sided print command), an address component designating the electronic address of a document or system providing a document related service, one or more parameter components, each parameter component defining a property of a document or a property of a service to be applied to a document, and a security parameter dependent upon the identity of a user associated with a document or with a document related service. This token is transmitted to another device (e.g. the network printer), which can check security, parameters, and modify its default operations in response to user input to the data processing device.

The invention employs "Satchel Document Tokens"—a special form of reference to a document or to a document service in portable devices, systems and methods for supporting mobile worker's document activities. These Satchel Document Tokens are henceforth simply referred to as "tokens". In accordance with the invention, tokens can be stored in small personal portable electronic devices and can be transmitted between holders of such devices. They can also be transmitted to appropriately equipped document devices (printers, scanners, copiers, faxes). Tokens contain the information necessary to access documents, to invoke a document services with appropriate parameter settings, or to initiate the actions of a document device with appropriate parameter settings. In addition, the token contains the security information which provides safeguards to ensure that unauthorized use of the documents or document services that are referenced in the token is precluded.

In preferred embodiments, a token contains at least the following components.

Basic Operation. The token specifies the particular operation that is to be performed, e.g. getting the document or performing a service (printing, scanning, faxing, converting). The action may be identified very generically here, with parameter settings used to identify the exact operation more specifically.

Address of document or document service. The token contains the information necessary to find the document or service. The address could consist of the network address of a server and the file path name of a document. A WWW Uniform Resource Locator (URL) is an example of a document address, and is used in the current Satchel prototype.

Parameters. The token contains a set of parameter settings that may be needed by subsequent services that are triggered by transmitting the token to a device. Parameters are used to further specify the document or document service (e.g. Number of copies to print). Some parameters may themselves be tokens. The specific types parameters required depends on the particular service.

Visible Name. The token contains a string or icon which can be displayed to identify the document or service to which the token refers for the benefit of the user.

Security Information. The security component of a token contains information to support ensuring that only the intended use of the token is possible.

The security information includes a digital signature of the information in the token. The digital signature is a digest of information in the token and its encryption with the document owner's private key. This follows well known prior cryptographic art relating to public/private key cryptography (see U.S. Pat. No. 4,405,829). These signatures can only be generated by the personal portable device since only it has the private key. The signature ensures the integrity of the token and attests that the token did originate from a known portable device.

The security information can also include specified conditions that will restrict access to a document. For example, it may include (1) an expiry date beyond which access to the document is no longer granted, (2) the condition that a payment or certificate for release must be associated with the token, and/or (3) a requirement that only a given device be used to print the document.

The security information can include a recipient's public key or name to indicate that the returned document be encrypted with the given public key or the known public key associated with the recipient's name. This ensures that only the intended recipient of the document can make use of the returned document and that an intercepted copy of either the encrypted document or the token is of no use to anyone other than the intended recipient. More generally, information for supporting fees and usage rights such as can be expressed in more complex fees and usage rights languages (such as described in Stefik, M., "Letting Loose the Light: Igniting Commerce in Electronic Publication. In *Internet Dreams: Archetypes, Myths, and Metaphors*. Edited by Mark Stefik. MIT Press, 1996), may be associated with the token.

Tokens which include security information are presented to "secure documents servers". A secure server contains a "gatekeeper" which verifies signatures on tokens and examines the specified conditions associated with the token and then acts accordingly (e.g. encrypting the document with the appropriate key). The public key for verifying the signature is obtained through a parameter in the security information which identifies the owner of the document or from a server which stores users' public keys.

As compared to conventional technology for document transfer and processing, token-based techniques in accordance with the present invention have various advantages, including:

(i) Portability—A laptop is generally too heavy to carry everywhere all the time. Tokens can fit into smaller amount of memory which will require less power, allowing the device to be even smaller. The smaller a device, the more easily it can be carried everywhere.

(ii) Serving unanticipated needs—If the user has forgotten to take the paper document or electronic document, he or she cannot give the document. A Satchel user can always provide a token for a document. There is no longer the burden of having to remember which documents to take.

(iii) Speed—A wireless transfer of a token between devices will always require less communication time than a wireless transfer of the actual document. This streamlines and speeds up the transfer transaction and improves its reliability. The lower transmission power requirements contribute to keeping the device small.

(iv) Ease of remote login—When using a laptop, the user attempts to find a means to login remotely to his/her home office machine or server to access documents. This is awkward and complicated, the physical connection devices may be wrong, access to the local network may be barred (no local login), or dial-up to home office may be expensive and slow. This is alleviated by providing the security information component in the token.

(v) Document transfer—Transferring an electronic document from one user to another is awkward, since the users must have a medium (floppy disks, which may be too small) or laptop-laptop network which will be clumsy to set up. Also, with tokens, any associated processing (e.g. format conversion) of a document can be performed when the token is submitted ("cashed-in") and anywhere where applications for processing are available.

(vi) Support for dynamic documents—A token can contain a reference to a document whose contents change (e.g. a weather forecast). The user can thus give a token for "he latest version" of a document. This is not possible with a static copy of the document from paper, laptop or floppy.

(vii) Security improvement—The loss or theft of the device doesn't mean documents are immediately accessible, only tokens. The secure server can be instructed to no longer honor tokens from the device (analogous to revoking a credit card). In the case of using a laptop or floppy, either the data is stolen, or the user must ensure all data on the laptop is encrypted.

A further benefit is in the enablement of diverse document-related activities, examples of which are given below.

(i) Tradable services. By encapsulating services in tokens, they can be passed on and distributed just like document tokens.

(ii) Partially Specified Services: The service may only be partially specified in the token. A simple example of a partially specified document service is one which prints a given document in a particular way on a printer (e.g. duplex two-up). The remaining specification of the service (e.g. the actual printer, the number of copies) may not yet be specified, but the token can nonetheless be passed from one user to another. The recipient can then use it as a known, reliable, and easy way of having a specific service performed, with their choice of further options.

(iii) Network supplied processing: The burden is on the token-enabled servers on the network to get the desired action performed, not on the limited personal device. By using tokens, neither the data nor the application of the document need be locally present, either on the portable device itself or at any local server. Service execution and invoking applications for particular data formats can be performed where the appropriate software is available.

Additional functions, objects, advantages, and features of the present invention will become apparent from consideration of the following description and drawings of preferred embodiments.

BRIEF DESCRIPTION OF THE DRAWINGS

FIG. 3 illustrates schematically the components of a token used in accordance with an embodiment of the invention, (a) in general form, and (b) the document form;

DETAILED DESCRIPTION OF THE DRAWINGS

1. System Hardware

As will be appreciated, the present invention may be implemented using conventional computer network technology, either using a local area network (LAN) or, more suitably, a wide area network (WAN). The invention has been implemented using conventional web browser software (e.g. Netscape) providing cross-platform communication and document transfer over the internet. However, it will be appreciated that the invention may be implemented using different system configurations: see EP'619. It will be appreciated that each fixed machine forming part of the network may be a PC running Windows™, a Mac running MacOS, or a minicomputer running UNIX, which are well known in the art, or any suitable processor-controlled network computer. For example, the PC hardware configuration is discussed in detail in *The Art of Electronics*, 2nd Ed., Ch. 10, P. Horowitz and W. Hill, Cambridge University Press, 1989.

Upon request of a user at a first machine, a document stored on a second machine may be retrieved and sent from the second machine over the internet, via any number of intermediate machines to the first machine. Also, the document may be retrieved using as a unique identifier its World Wide Web URL, as discussed in EP'619. Preferably also connected to the network are any number of processor-controlled printers, scanners, fax machines or multifunction devices (capable of scanning, printing, copying and/or faxing, etc.), as discussed in EP'619. Each machine coupled to the network is also equipped with appropriate hardware and software, which is known in the art, for communication with portable computing devices, such as personal digital assistants (PDAs), handheld PCs, or pocket or wristwatch computers.

Figure 1:
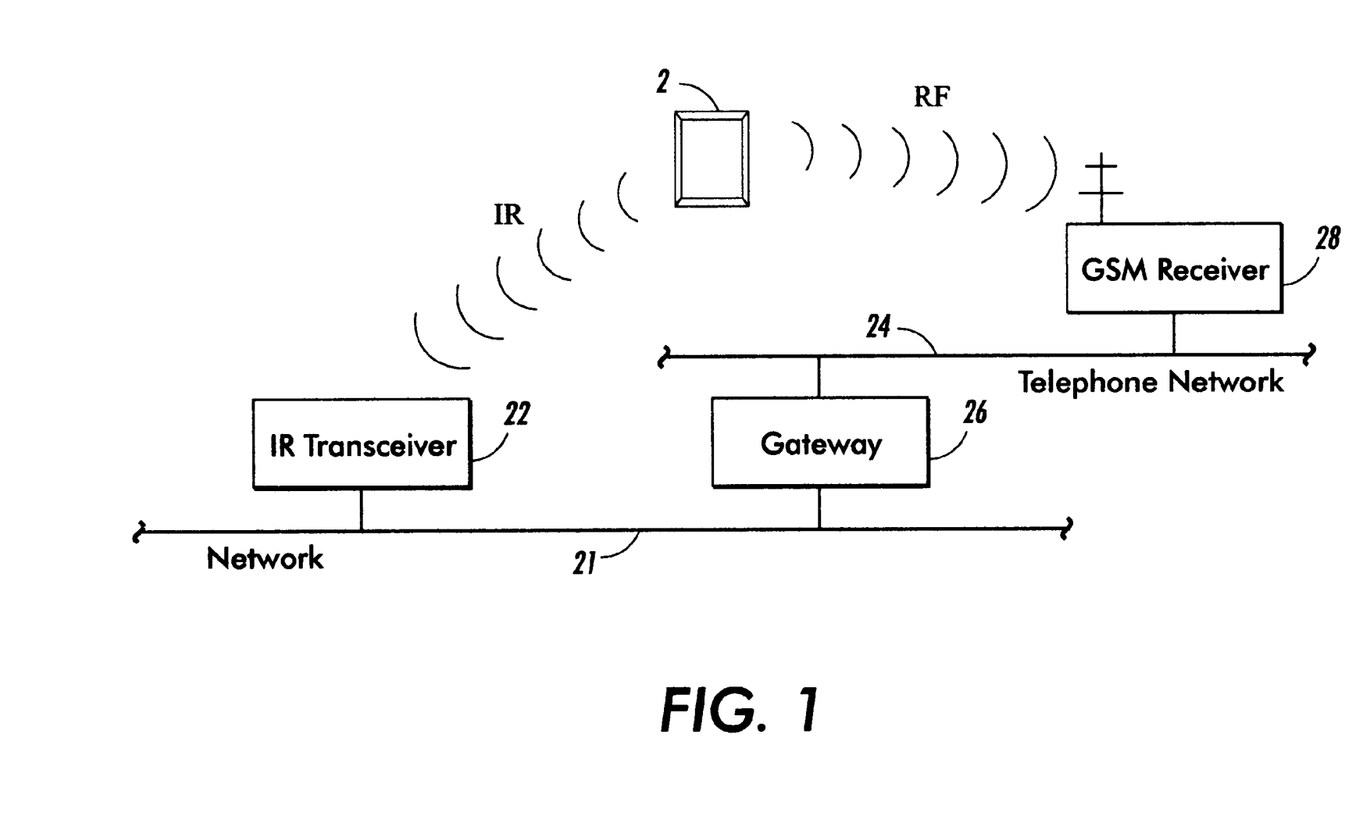
FIG. 1 illustrates schematically a portion of the network infrastructure which may be used to implement embodiments of the invention.

As shown in FIG. 1, a pervasive computer network 21 has an infrared transceiver 22 for each room, desk, workstation, copier, printer etc., coupled thereto. (For the sake of clarity, only one transceiver 22 is illustrated). In addition, however, the network 21 is coupled to the conventional telephone network 24 by means of gateway 26, which is known in the art. In this way, the portable computing device 2 is able to communicate with devices on the network 21 not only by IR signals to/from transceivers 22, but also (when additionally or alternatively provided with digital radio frequency communications hardware (not shown)) by RF signals to/from a digital cellular base station 28 of the telephone network 24. Suitably, the RF communications hardware (not shown) complies with the GSM digital standard, thereby permitting transmission of digital data between the portable device 2 and the base station 28, which suitably comprises a GSM receiver/transmitter.

Figure 2:
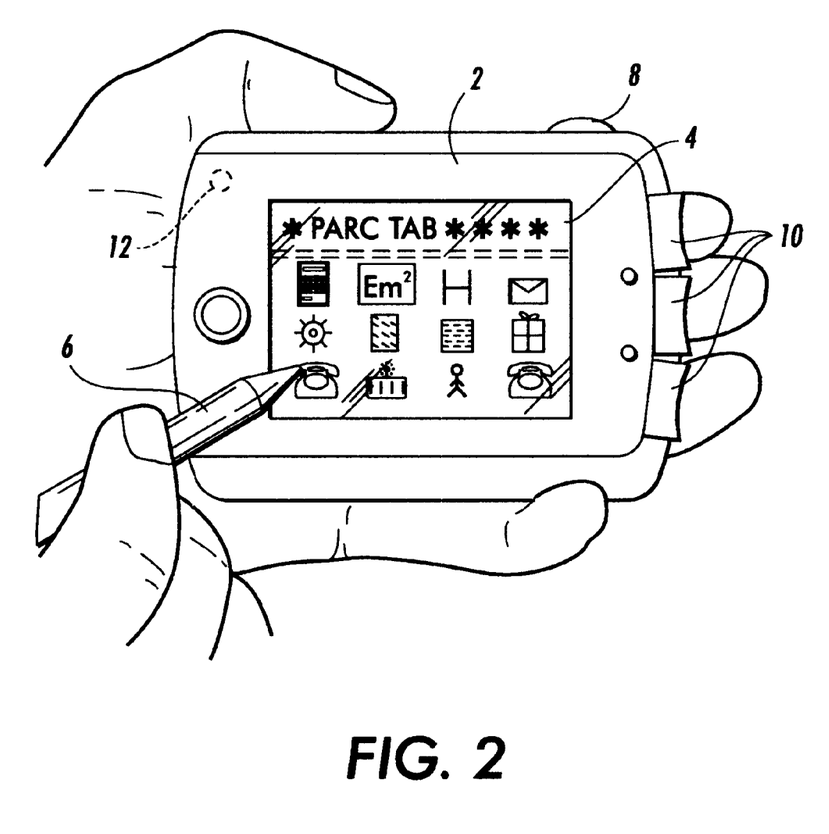
FIG. 2 shows a portable computing device used in accordance with an embodiment of the invention.

While a preferred form of portable computing device is shown in FIG. 2, it will be appreciated that the computing device may be fabricated in a multitude of forms: for example, the device 2 may be of any of the forms disclosed in U.S. Pat. No. 5,982,520 ("Personal storage device for application and data transfer", filed Mar. 28, 1996). In its preferred form, each portable computing device 2, and each of the fixed machines on the network, is equipped for infrared communication. Data packets transmitted between the computing device 2 and the fixed machines enable the document(s) to be retrieved, and conform to the physical and link layer formats (IrLAP) described in the industry standard Infrared Data Association (IrDA) specification, version 1.0, which is well known in the art.

The tokens concept described here provides an essential component of a system solution that addresses these needs of the mobile worker (e.g. Satchel; EP '619), within the technological constraints described above.

A token contains the small amount of essential information which allows the system (token-capable server software resident on public networks and private networks) to initiate actions which produce the desired result. For example, printing out a document only needs a simple interaction: The document's token is selected on the user interface of the small device. This token is incorporated as a parameter of a token identifying the print service. When the latter token is received by the server software via a wireless and then a wired connection (e.g. an infrared receiver which is tethered to the local network), the servers acts on the receipt of the token and causes the document to be retrieved, processed, and printed. In this way it is only the token that is transmitted from the personal portable device via wireless means and then it is fixed, wired, communications that is then used to move the actual document data, appropriately processed, to the end device (a printer in this example). The net effect is that a user can produce a desired action in a quick and simple way.

2. Satchel Token—Components ("Packet Encoding")

Figure 3A:
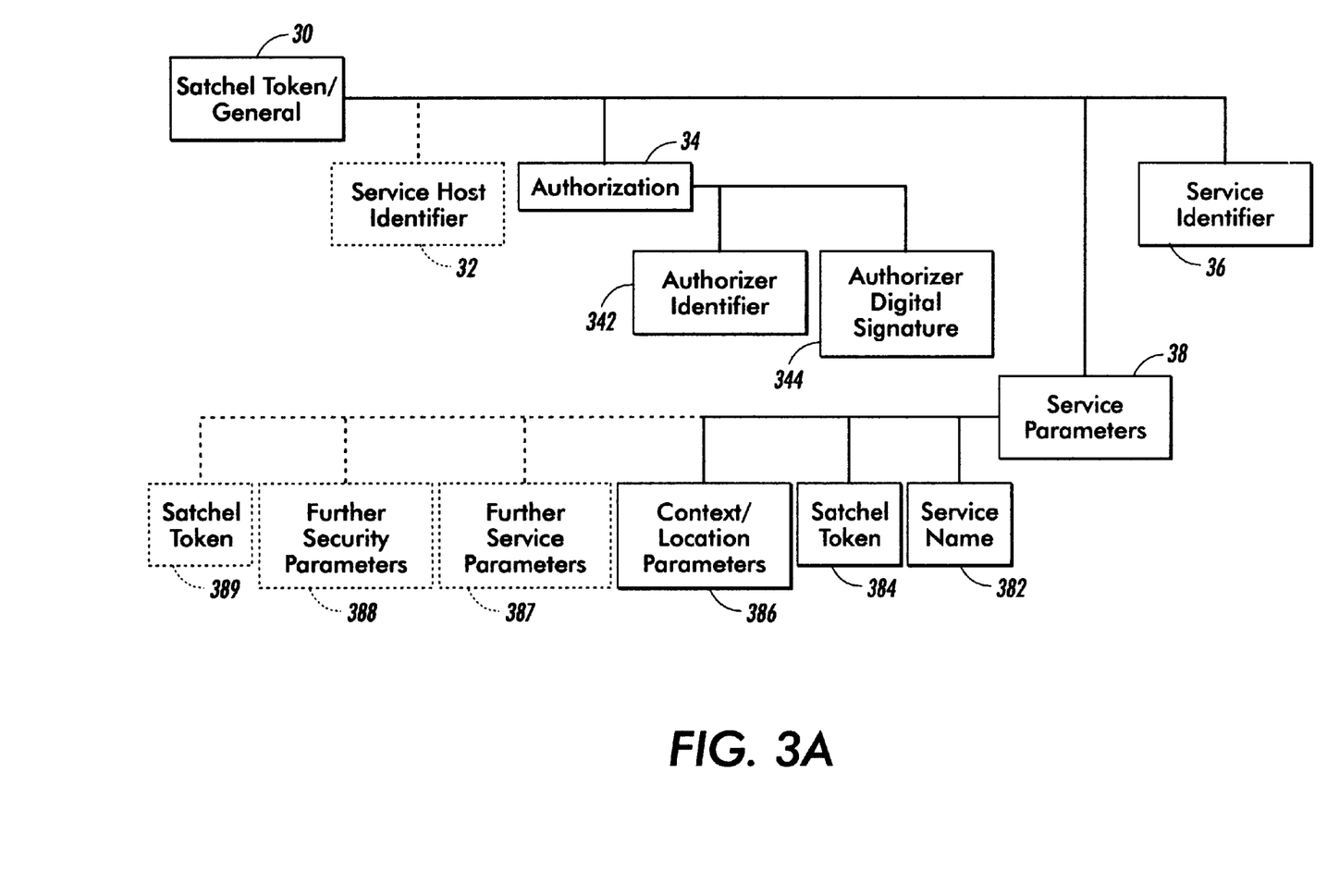
Figure 3B:
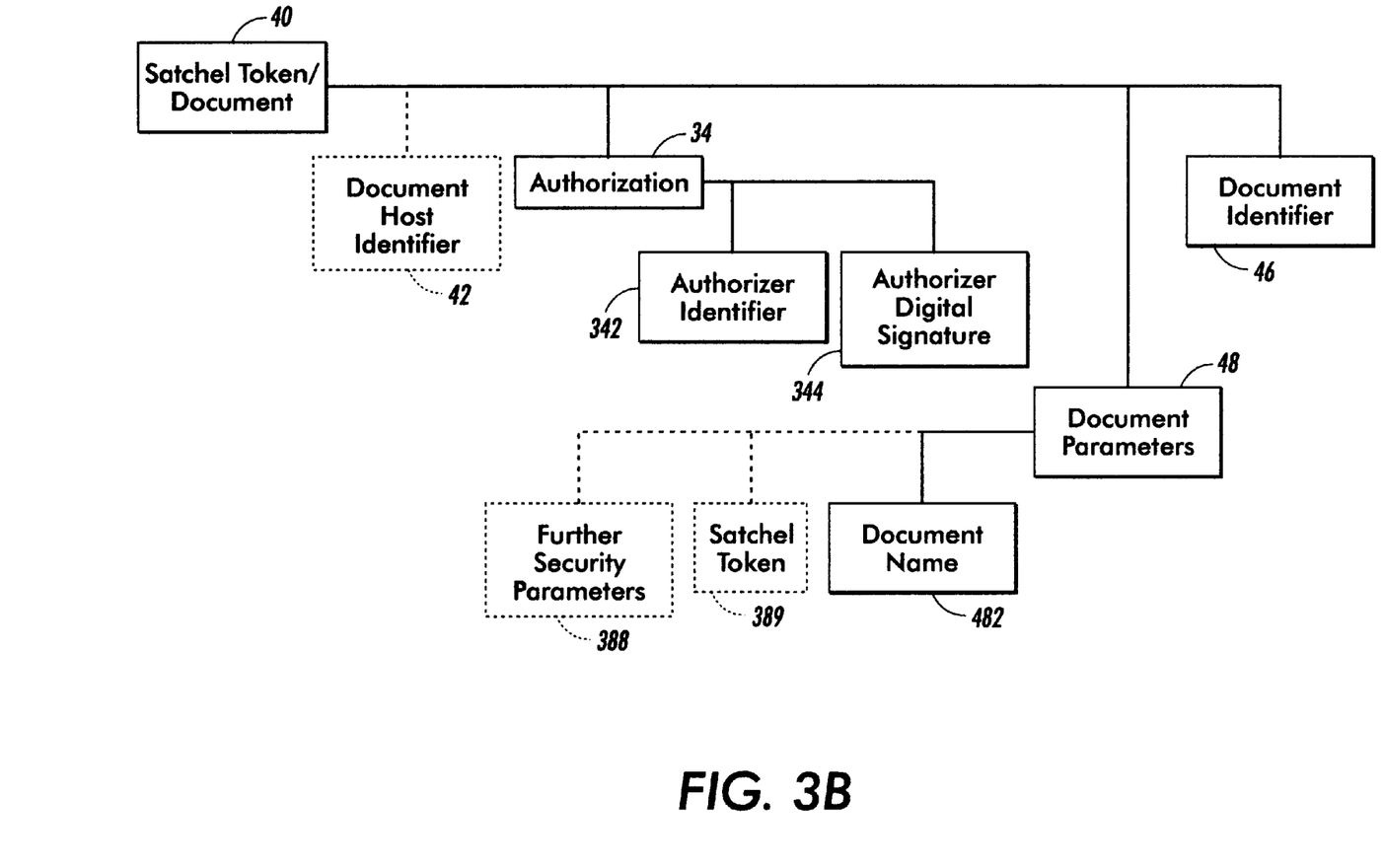

FIGS. 3(*a*) and 3(*b*) are schematic diagrams of the contents of a Satchel Token. They show, abstractly, the main components of a Satchel Token. FIG. 3(*a*) is the more general form which specifies the structure of any token, whether it is for a service or for a document. FIG. 3(*b*) is a simpler version of the same token—one which specifies the form of a Satchel Token when the token only embodies a straight document request.

In FIGS. 3(*a*) and 3(*b*) and the following description, text in bold indicates a component which may have further components (e.g. Service Parameters). Boxes and lines which are dashed indicate components which may be present in some tokens, but need not be present in all tokens, i.e. they are not required in order to make a valid Satchel Token.

Referring to FIG. 3(*a*), the components (32, 34, 342, 344, 36, 38, 382-389) of the general form of the satchel token 30 are schematically illustrated. All the components (32, 34, 342, 344, 36, 38, 382-389) taken together form a Satchel Token general 30. They are stored inside a user's PDA 2 (but they can also be stored in user's personal computers/workstations) as small packets having the structure indicated in FIG. 3. They are taken out of this form and linearised (made into a straight linear sequence of ASCII characters) when needed. This can be done for two reasons: (i) so that a token can be transported through some communications medium (wired or wireless) and (ii) so that the token as a whole can be taken as a linear sequence of ASCII characters for secure hashing and then digital signing operations to form the token's digital signature component.

The general token 30 includes a Service Host Identifier 32 which identifies a host machine on a network. This component indicates to the system where the document or service is available from a host machine on the network. Typically this is in the form of a standard Internet Fully Qualified Domain Name. The Service Host Identifier 32 need not be filled into the token 30 by the user's PDA 2. This flexibility is essential in order to implement the context sensitive capabilities feature of the Satchel System. This component 32 of a token 30 may be filled in at a later stage in the processing of a token 30. For example, the infra-red transceiver device which accepts and conveys tokens can fill in the Service Host Identifier 32—in order to specify a Service Host Identifier 32 that is appropriate for that transceiver device's location.

Authorization—The general token 30 includes a component 34 which in turn contains the two main security components. It provides the means by which the system can verify that the token is genuine and has not been tampered with.

The first security component is an Authorizer Identifier 342—This component indicates the person that created the token 30. The Authorization identifier 342 may be as simple as an ASCII string of the user's name, or be as complex as a full X.509 identity certificate (see ITU-T Recommendation X.509—CCITT document "The Directory-Authentication Framework"). The second security component is an Authorizer Digital Signature 344, which is a string created by the following method: (a) linearise all other components in the token to produce an ASCII string, (b) produce a hash of the string using any suitable well-known secure hash function (e.g. MD5, SHA; see *Applied Cryptography* by Bruce Schneier, 1996, John Wiley and Sons), and (c) encrypt the hash with the user's private key, which is only kept in the PDA. Note that the Authorizer Digital Signature 344 itself is not part of the hash, but the Authorizer Identifier 342 is.

Another component of the general token 30 is the Service Identifier 36. The Service Identifier 36 is a component which identifies the particular service (or document) that is to be invoked (or requested) on behalf of the user. A feature of the system according to the invention is that this Service Identifier 36 may only identify a general class of service, with the actual service being invoked being deduced by the system from this Service Identifier 36 and the additional Service Parameters (discussed below) provided.

The general token 30 includes a further component designated Service Parameters 38. This component itself has several components 382–389 which serve to further specify the service request. The Service Parameters 38 includes Service Name 382, which identifies how a service is identified to the user as a visible name in the user interface of the PDA 2. This may be simply a familiar name, e.g. "Print" or "Scan" or "Fax", a graphic icon, or can be more complex, e.g. a type-in form to be filled in by the user. Also included in Services Parameters 38 is Satchel Token 384. A Satchel Token 30 can itself contain zero or more further Satchel Tokens 384,389. This is a key aspect of the design of this invention in that it allows more complex user requests to be created in the form of Satchel Tokens 30 which are composed of other Satchel Tokens 384,389. This is indicated in FIG. 3 by the Satchel Token boxes 384,389. They can contain another full token, be it a General Satchel Token 30 or simple Document Satchel Token 40.

The Service Parameters 38 further includes Context/Location Parameters 386. This component contains parameters which identify the context in which the request is made. The parameters may be filled into the token 30 either by the PDA device 2 itself or the wireless transceiver devices (infra-red) 22. The location parameters 386 can include, for example: the type of document device (printer, scanner, fax) that the transceiver is attached to, the local name of the document device, the room in which the request was made, the time when the request was made, the country in which the request was made.

As shown, as part of the Service Parameters 38, Further Service Parameters 387 may be included. This component contains parameters which can specify the particulars of a request even further. Examples of Further Service Parameters 387 include: the number of copies to be printed, the phone number of a fax machine that a document is to be faxed to, the name of a scanned document. In addition, another component of the Service Parameters 38 may be Further Security Parameters 388. The use of the token 30 can be restricted, and these restrictions supported, by indications in the Further Security Parameters component 388. Such additional information can include: a cryptographic key to use to encrypt a document when the token is used to request it, an expiry date for the validity of the token, a restriction on the type or identity of the device that the document can be printed on. Additionally, a full specification of the digital property rights of the document can be added using a statement in a digital property rights language (DPRL) (see the abovementioned M. Stefik reference). Since tokens 30 can contain tokens, security restrictions that must be satisfied can be associated with tokens at each level.

Referring now to FIG. 3(b), this is a simplification of FIG. 3(a), and shows the simpler form of token—a Satchel Token/Document (or "Document Token") 40—when the token is simply a request to access a document. In FIGS. 3(a) and 3(b) like reference numerals denote like elements. In the case of the token 40 of FIG. 3(b), the component embodying the Service Identifier 36 is Document Identifier 46. This indicates to the system where the document is located. Also, the component embodying the Service Host Identifier 32 is the Document Host Identifier 42. Also, for the document token 40, a component designated Document Parameters 48 is included. This component itself has several components which serve to further specify the document request. The Document Parameters 48 includes a Document Name component 482, indicating how the document is named for visible display in the PDA user interface—i.e. a title, as well as satchel token 389 and Further Security Parameters as in FIG. 3(a).

3. Transactions with Tokens

Figure 4:
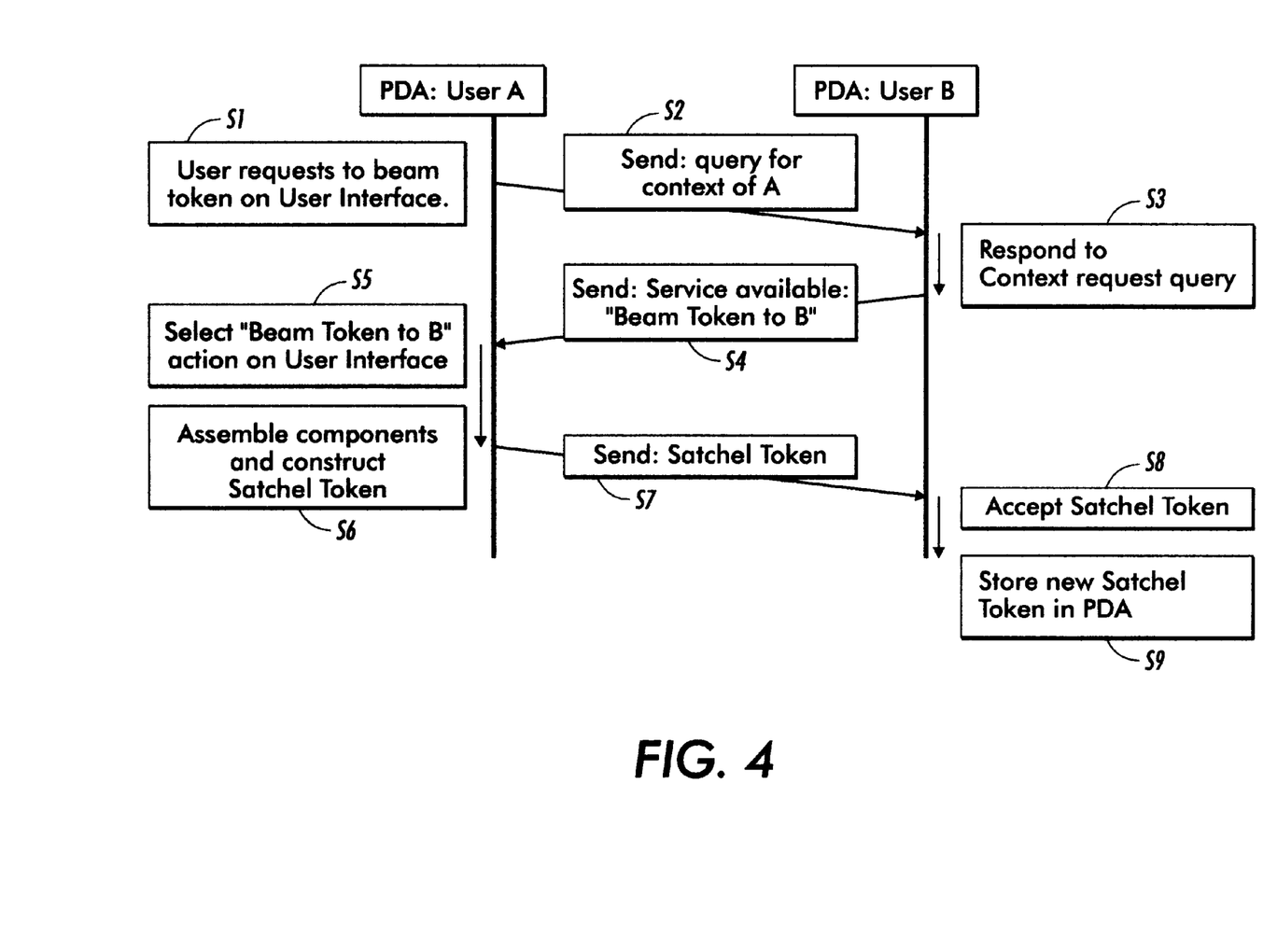
FIG. 4 is a schematic flow chart of the steps in exchanging tokens in accordance with an embodiment of the invention.

FIG. 4 is a schematic flow chart of the steps in exchanging a token (between the PDAs of users A and B), in accordance with an embodiment of the invention. Initially (step s1) an input is received from user A, requesting the transmission of a token. This request may be input by user A via the user interface of the PDA by means of button presses, selection from pull down menus, and/or dragging and dropping of icons, as is well known in the art (see, e.g. EP'619).

In response to the user request, the PDA of user A (hereafter PDA A) transmits (step s2) a query (by wireless, and preferably IR, signals) for the context of user A, i.e. for the identification of the users (here: B) of those PDAs which are in range of communication. Next, the PDA of user B (hereafter PDA B) receives the context request query and prepares a response (step s3). Once compiled in suitable form, the "Service available" reply is sent (step s4) by PDA B. This amounts to saying that it is OK to send the token from user A's PDA to that of user B. When sending this reply, PDA B can provide a user identity or cryptographic key (public) associated with the "Service Available" information.

Once the "Service Available" indication is received by PDA A, user A is prompted to make a further selection (step s5) via the user interface of PDA A, corresponding to the action "Beam Token to User B"—see EP'619). Then, at step s6, the necessary components (see FIG. 3) are assembled and the token (30, 40) constructed. This is followed by the wireless transmission of the token (i.e. as an IR data packet) (step s7) from PDA A to PDA B. Once received (step s8) at PDA B, the newly-arrived token is stored in PDA B (step s9) in the conventional manner, and this may be with or without further intervention by user B to place (an icon for) the newly-received token in an appropriate directory.

Figure 5:
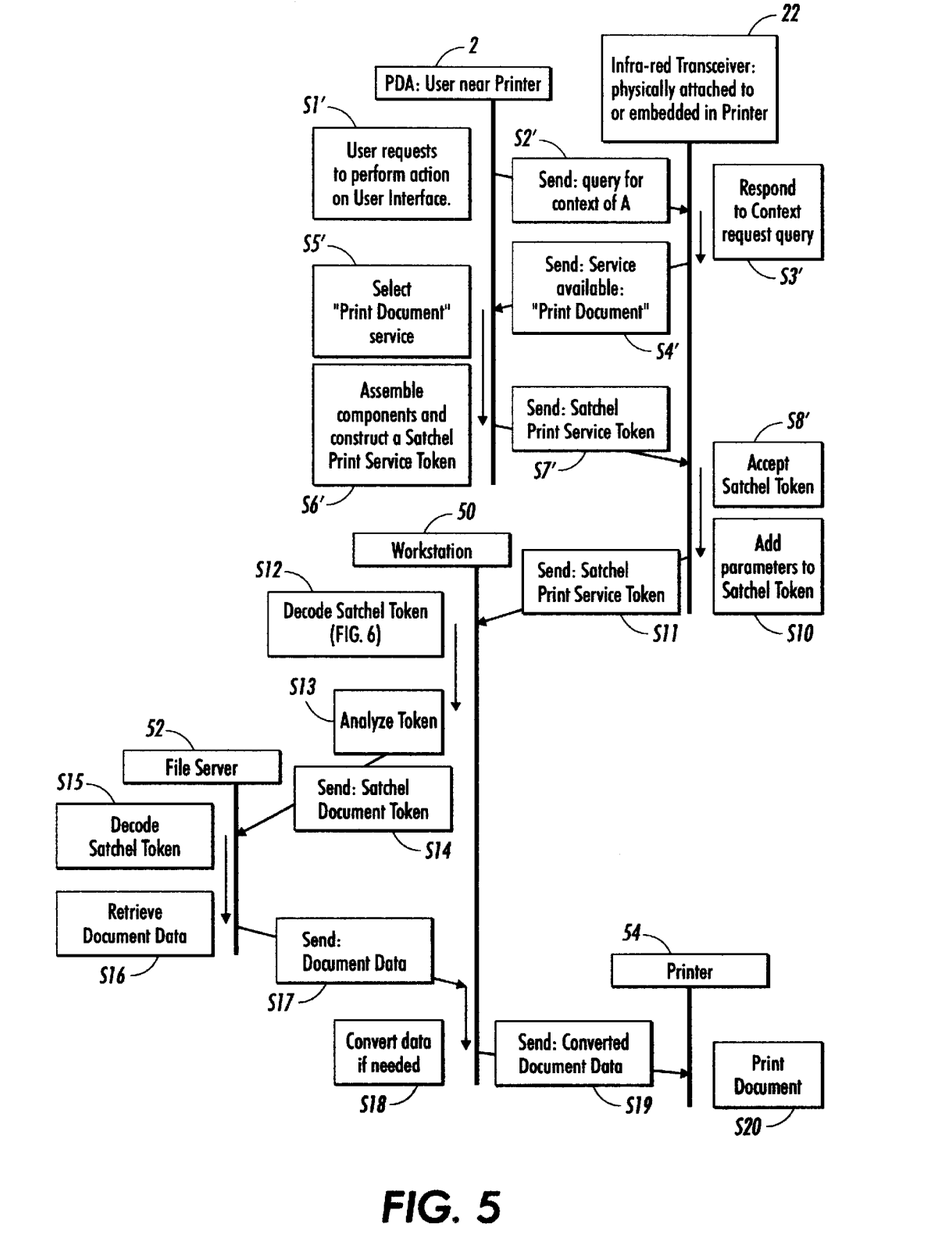
FIG. 5 is a schematic diagram of the steps involved in the transfer, in accordance with an embodiment of the invention, of a token between a portable computing device and one or more fixed devices.

FIG. 5 is a schematic diagram of the steps involved in the transfer, in accordance with an embodiment of the invention of a (print service) token between a portable computing device (PDA) and a fixed device (printer) in order to accomplish the printing of a document. The top part of FIG. 5 is the same as FIG. 4, except that PDA B is replaced by an IR transceiver 22 on the network 21 of FIG. 1: the transceiver 22 may by physically attached to (and electronically coupled to) or embedded in, the printer on which it intended to print the document. Also, steps s1' to s8' in FIG. 5 correspond to the steps s1 to s8 of FIG. 4, except that the service is a "Print Document" service, and the token transmitted is a Satchel Print Service token. Parameters (see FIG. 3) corresponding to the specific action to perform, in this case printing, may be incorporated into the token either by the PDA 2 when assembling the token (s6, s6') or by the transceiver 22 upon receipt, depending on the circumstances.

In FIG. 5, step s8' is followed by the step (s10) of adding parameters to the received satchel (print service) token: these may include any of the (components of the) parameters 38, 48 of FIG. 3. Once the parameters have been appended to the token, the token is sent over the network to workstation 50. At workstation 50, upon receiving the token, the first step (s11) is to decode the token: this involves checking the Authorization (see FIG. 3), and is described in more detail below in connection with FIG. 6. Then, the token is analyzed at step s13: the substeps constituting the procedure of step s13 are described in more detail below with reference to FIG. 7. An element of this routine is the request for a document held in an electronic repository—here it is illustrated as being stored on a remote file server 52 (which may be in a different building or in a different country), although it will be appreciated that the document could be stored locally on the workstation 50. Thus, in order to request the document the document token is sent (step s14) to file server 52 where it is decoded (step s15) upon receipt, so as to extract the Document Identifier 46 (see FIG. 3(b)), e.g. a WWW URL. Using the Document Identifier 46, the document data (electronic file) are retrieved by the file server 52. The document data are then sent over the network at step s17, in the conventional manner, to the workstation 50 which originally received the Print Service token. Once the document data are received at the workstation 50, a check is made to see whether the data must be converted (to a different format), and if so, the conversion is carried out at step s18. For example, printer 54 associated with transceiver 22 may be capable of printing only in PostScript® format; and step s10 therefore included adding parameters to the token designating that the data file sent ultimately to the printer must be converted to PostScript® format. Following conversion (if necessary), the (converted) document data are sent (step s19) to the printer 54. Upon receiving the document data, the document is printed (s20) by the printer in the conventional manner.

Figure 6:
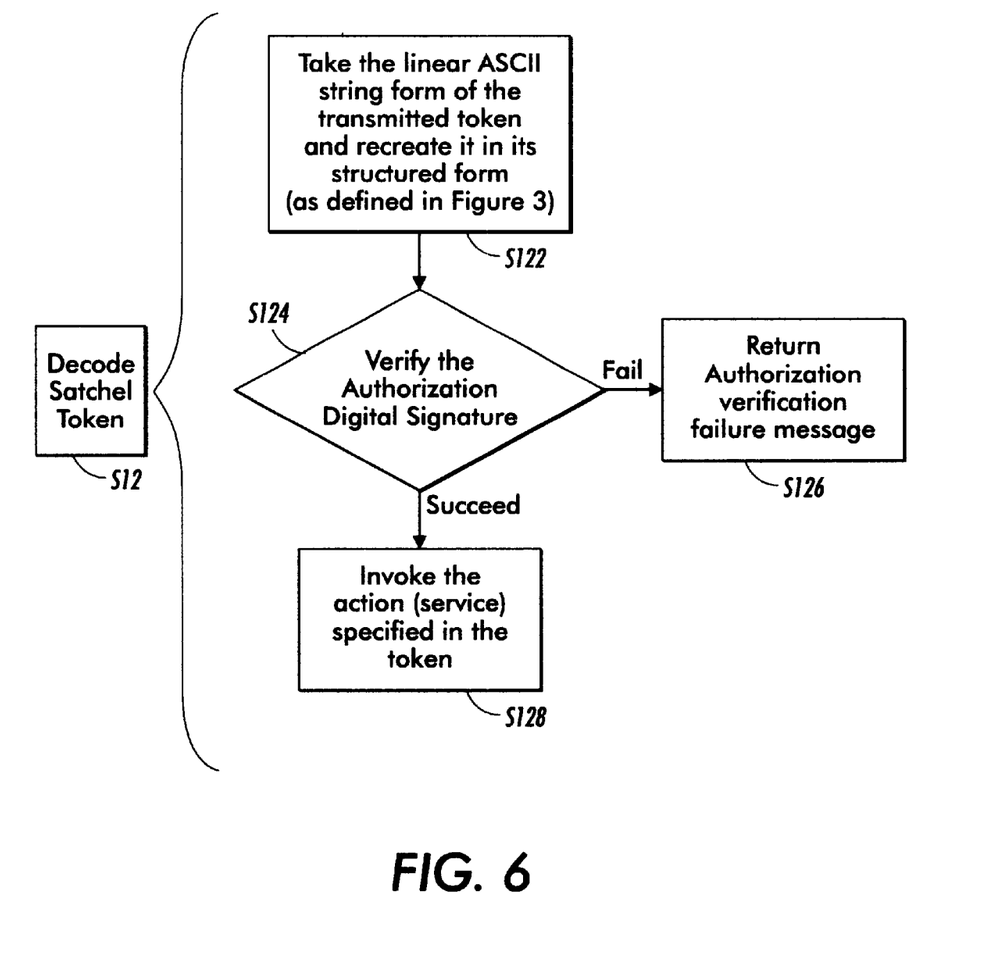
FIG. 6 is an illustration of the steps involved, in accordance with an embodiment of the invention, in decoding the token of FIG. 3, once received.

FIG. 6 shows in detail the substeps of the decode Satchel token step of FIG. 5. First the linear ASCII string form of the token as received at workstation 50 is recreated in its structured form, as shown in FIG. 3. Then, a test is made at step s124 to see if the X Authorization Digital Signature (344; FIG. 3) verifies. If the test is failed, an "Authorization verification failure" message is returned (step s126), i.e. output to the user in a conventional manner. If success is obtained in the test of step s124, the action (service)—here printing a document—is invoked by workstation 50, as described elsewhere.

Figure 7:
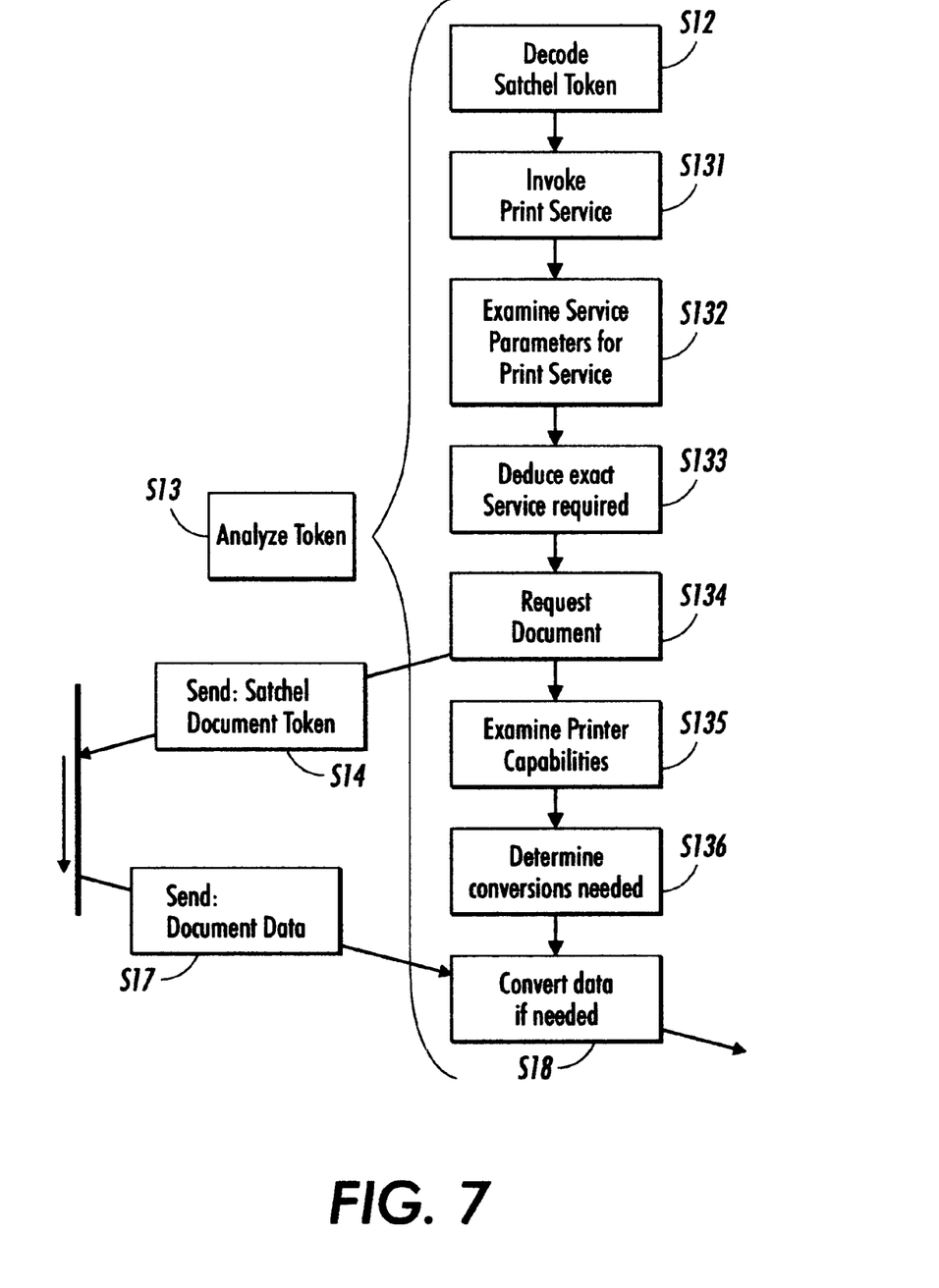
FIG. 7 is a schematic flow chart of the steps involved in carrying out the appropriate action as specified in the token as received as in FIG. 6.

FIG. 7 shows in detail the substeps involved in the Analyze Token step in FIG. 5. Initially, the print service is invoked (step s131), by virtue of the Service Identifier parameter 36 (FIG. 3) designating a print request. Then, the Service Parameters 38 (FIG. 3) are examined (step s132); for example, the printing device which is to perform the print (service) may have been specified by user (and included as a parameter) prior to transmitting the token, or may have been added (step S10; FIG. 5) based on context/location parameters 386 (FIG. 3(a)). The token may include further service parameters, as discussed in Section 2 above. This enables the exact print service required (e.g. printer id, number of copies, 2-sided, etc.) to be deduced (step s133).

Once this has been done, the document to be printed is requested (step s134), and the document token sent to the file server (see FIG. 5). Then, the capabilities of the chosen printer are examined (step s135): this may show that the printer can only print with a certain paper size, with only certain fonts, or only documents in PostScript® format, for example. In this way, the conversion techniques which need to be performed on the document data received from the file server (52; FIG. 5) can be determined (step s136). Then, once the document data are sent (s17) to the workstation 50 (FIG. 5), the necessary conversion can be carried out (step s18) prior to dispatch of the document to the chosen printer.

As those skilled in the art will appreciate, other various modifications, extensions, and changes to the foregoing disclosed embodiments of the present invention are contemplated to be within the scope and spirit of the invention as defined in the following claims.

What is claimed is:

1. A system for accessing electronic documents in a repository of electronic documents coupled to a wire based network, the system comprising:
    (A) a mobile data processing device, comprising:
        (a) a processor with coupled memory,
        (b) a user input module coupled to the processor to generate a document related user input that specifies a document related service to be performed on a document stored in the repository of electronic documents,
        (c) a token building module coupled to the user input module for receiving the document related user input and constructing a general token including: (i) a first service parameter defining a first property of the document related service and (ii) an address component designating an electronic address of the document in the repository of electronic documents to which the document related service is to be performed, and
        (d) a wireless transceiver for transmitting the constructed general token;
    (B) a wired transceiver coupled to the wired based network for communicating with the mobile data processing device to receive the general token; the wired transceiver specifying a second service parameter defining a second property of the document related service in the general token; and
    (C) a workstation coupled to the wired based network for communicating with the wired transceiver to receive the general token; the workstation analyzing the service parameters in the general token to deduce a document service system for performing the document related service specified in the general token on the document.

2. The system according to claim 1, wherein the workstation examines capabilities of the document service system for determining and carrying out conversions to the document prior to transmitting the document to the document service system for performing the document related service specified in the general token on the document; wherein the conversions carried out on the document put it in a format suitable for processing at the document service system.

3. The system according to claim 1, wherein the repository of electronic documents forms part of the workstation.

4. The system according to claim 1, wherein the workstation analyzes at least one of a single or double sided copying parameter and a number of copies parameter in the service parameters to deduce the document service system for providing the document related service.

5. The system according to claim 1, wherein the wired transceiver specifies the second service parameter in the general token using a context/location parameter.

6. The system according to claim 5, wherein the service parameters of the general token further includes an electronic address of the document service system for providing the document related service.

7. The system according to claim 5, wherein the general token further includes a security parameter that is verified by the workstation.

8. The system according to claim 7, wherein the security parameter specifies a digital property right in a digital property rights language.

9. The system according to claim 7, wherein the security parameter specifies one of a digital signature, a digital property right, a cryptographic key to encrypt the document, an expiry date for the validity of the first token, and an authorizer identifier.

10. The system according to claim 1, wherein the parameter component is one of a single sided print command, a double sided print command, number of copies to be printed, a phone number of a fax machine that the document is to be faxed to, and the name of a scanned document.

11. The system according to claim 1, wherein the document related service includes one of a print service, a fax service, and a scan service.

12. A wireless data transfer procedure carried out in a system for accessing electronic documents in a repository of electronic documents coupled to a wire based network, the system including: a mobile data processing device, comprising: a processor with coupled memory, a user input module coupled to the processor to generate a document related user input, a token building module coupled to the user input module, and a wireless transceiver; a wired transceiver coupled to the wired based network for communicating with the mobile data processing device; and a workstation coupled to the wired based network for communicating with the wired transceiver; the wireless data transfer procedure comprising:
 (a) receiving at the token building module the document related user input that specifies a document related service to be performed on a document stored in the repository of electronic documents;
 (b) responsive to (a) constructing at the token building module a general token including: (i) a first service parameter defining a first property of the document related service and (ii) an address component designating an electronic address of the document in the repository of electronic documents to which the document related service is to be performed;
 (c) transmitting using the wireless transceiver the constructed token to the wired transceiver;
 (d) responsive to (c) specifying at the wired transceiver a second service parameter defining a second property of the document related service in the general token;
 (e) responsive to completing (d) transmitting the general token from the wired transceiver to the workstation over the wire based network; and
 (f) analyzing at the workstation the service parameters in the general token to deduce a document service system for performing the document related service specified in the general token on the document.

13. The wireless data transfer procedure according to claim 12, wherein the wired transceiver specifies the second service parameter in the general token using a context/location parameter.

14. The wireless data transfer procedure according to claim 12, further comprising examining at the workstation capabilities of the document service system to determine and carry out conversions to the document prior to transmitting the document to the document service system for performing the document related service specified in the general token on the document; wherein the conversions carried out on the document put it in a format suitable for processing at the document service system.

15. The wireless data transfer procedure according to claim 14, wherein the general token is constructed with service parameters that include an electronic address of the document service system for providing the document related service.

16. The wireless data transfer procedure according to claim 15, wherein the general token is constructed with a security parameter that is verified by the workstation.

17. The wireless data transfer procedure according to claim 16, wherein the security parameter specifies a digital property right in a digital property rights language.

18. The wireless data transfer procedure according to claim 16, wherein the security parameter specifies one of a digital signature, a digital property right, a cryptographic key to encrypt the document, an expiry date for the validity of the first token, and an authorizer identifier.

19. The wireless data transfer procedure according to claim 12, wherein the parameter component is one of a single sided print command, a double sided print command, number of copies to be printed, a phone number of a fax machine that the document is to be faxed to, and the name of a scanned document.

20. The wireless data transfer procedure according to claim 12, wherein the document related service includes one of a print service, a fax service, and a scan service.

21. A system for accessing electronic documents in a repository of electronic documents coupled to a wire based network, the system comprising:
 (A) a mobile data processing device, comprising:
  (a) a processor with coupled memory,
  (b) a user input module coupled to the processor to generate a document related user input that specifies a document related service to be performed on a document stored in the repository of electronic documents,
  (c) a token building module coupled to the user input module for receiving the document related user input and constructing a general token including: (i) a first service parameter defining a first property of the document related service and (ii) an address component designating an electronic address of the document in the repository of electronic documents to which the document related service is to be performed, and
  (d) a wireless transceiver for transmitting the constructed general token;
 (B) a wired transceiver coupled to the wired based network for communicating with the mobile data processing device to receive the general token; the wired transceiver specifying a second service parameter defining a second property of the document related service in the general token; and
 (C) a workstation coupled to the wired based network for communicating with the wired transceiver to receive the general token; the workstation analyzing the service parameters in the general token to deduce a document service system for performing the document related service specified in the general token on the document; wherein the workstation examines capabilities of the document service system for determining and carrying out conversions to the document prior to transmitting the document to the document service system for performing the document related service specified in the general token on the document.

* * * * *